United States Patent [19]

Akaki et al.

[11] Patent Number: 5,425,343
[45] Date of Patent: Jun. 20, 1995

[54] FUEL INJECTION CONTROL DEVICE FOR INTERNAL COMBUSTION ENGINE

[75] Inventors: Motonobu Akaki; Yasutoshi Yamada; Nobuyuki Oota, all of Aichi; Masaki Mitsuyasu; Daisaku Sawada, both of Shizuoka, all of Japan

[73] Assignees: Aisin Seiki Kabushiki Kaisha, Kariya; Toyota Jidosha Kabushiki Kaisha, Toyota, both of Japan

[21] Appl. No.: 182,836

[22] Filed: Jan. 19, 1994

[30] Foreign Application Priority Data

Jan. 19, 1993 [JP] Japan .................. 5-023158

[51] Int. Cl.⁶ .................. F02D 41/20; H01L 41/08
[52] U.S. Cl. .................. 123/490; 310/317
[58] Field of Search .......... 123/299, 300, 478, 490, 123/498; 310/316, 317, 318; 361/152, 154, 207

[56] References Cited

U.S. PATENT DOCUMENTS

| | | | |
|---|---|---|---|
| 4,621,599 | 11/1986 | Igashira et al. | 123/300 |
| 4,644,212 | 2/1987 | Moritugu et al. | 310/317 |
| 4,688,536 | 8/1987 | Mitsuyasu et al. | 123/490 |
| 4,705,003 | 11/1987 | Sakakibara et al. | 123/490 |
| 4,732,129 | 3/1988 | Takigawa et al. | 123/478 |
| 4,767,959 | 8/1988 | Sakakibara et al. | 310/317 |
| 5,053,668 | 10/1991 | Mitsuyasu | 310/317 |
| 5,057,734 | 10/1991 | Tsuzuki et al. | 310/317 |
| 5,130,598 | 7/1992 | Verheyen et al. | 310/316 |

FOREIGN PATENT DOCUMENTS

| | | |
|---|---|---|
| 0464443 | 1/1992 | European Pat. Off. . |
| 1264575 | 10/1898 | Japan . |
| 169756 | 3/1964 | Japan . |
| 2-103970 | 4/1990 | Japan . |
| 4-54253 | 2/1992 | Japan . |

Primary Examiner—Willis R. Wolfe
Attorney, Agent, or Firm—Burns, Doane, Swecker & Mathis

[57] ABSTRACT

Piezoelectric element used in a fuel injection value is to be improved in its response to expansion and contraction, while the supply of an excess energy to the piezoelectric element is to be controlled. In a fuel injection control device in which an output voltage of the dc-dc converter is applied to a piezoelectric element via a choke coil and a thyristor, a current detection unit is provided between the dc-dc converter and the thyristor. A measured value of the electric charge, as found by integrating a charging current flowing through the current detection unit is compared by a comparator to a command value of electrical charges as found by processing the dc-dc converter output voltage. The results of comparison are supplied to a latch unit so as to be latched at the timing of a peak value of the charging current. A capacitor is charged and discharged depending on an output of the latch unit, and the terminal voltage across the capacitor and the output voltage of the dc-dc converter are compared to each other for controlling the output voltage of the dc-dc converter.

4 Claims, 2 Drawing Sheets

FUEL INJECTION CONTROL DEVICE FOR INTERNAL COMBUSTION ENGINE

BACKGROUND OF THE INVENTION

1. Field of the Invention

This invention relates to a fuel injection control device for an internal combustion engine. More particularly, it relates to a fuel injection control device in which a piezoelectric element is employed in a fuel injection valve and in which the shape change in the element caused by application of an electric voltage thereto is utilized.

2. Related Art

It has hitherto been known to use a piezoelectric element for a fuel injection valve for controlling the fuel injection. For example, the JP Patent KOKAI Publication No. 64-69756 (1989) discloses means for stabilizing changes in capacitance of a piezoelectric element caused by changes in temperature. The piezoelectric element is increased in capacitance with the rise in temperature. If the capacitance is increased, the piezoelectric element is deformed to a larger extent for the same applied voltage because the deformation in the piezoelectric element is proportionate to the amount of the stored electric charge which is proportionate to the capacitance value. The above cited publication proposes a fuel injection control device equipped with means for detecting the change in temperature of the piezoelectric element and accordingly controlling the voltage applied to the piezoelectric element for controlling a displacement of the piezoelectric element.

DISCUSSION OF THE RELATED ART

In the injection control device, the fuel is usually supplied in a quantity proportionate to the fuel injection time. A control signal for controlling the fuel injection time is supplied from a micro-computer to the fuel injection control device as pulse signals.

Heretofore, problems have existed that the electric voltage applied to the piezoelectric element is reduced during the transient period when the fuel injection control signal pulse is changed from a narrow pulse width state to a broad pulse width state, as a result of which the piezoelectric element can not be extended to a predetermined value until the steady state is reached and the stable control is initiated, and hence the piezoelectric element can not be used as the injection port during such time.

On the other hand, when the fuel injection control signal is changed from a broad pulse width state to a narrow pulse width state, the voltage applied to the piezoelectric element is increased during the transient period, such that an electric energy is applied in a value more than is necessary to the piezoelectric element until the steady state is reached and stable control is initiated.

It is therefore an object of the present invention to provide a fuel injection control device in which the response in the control of the extension and contraction of the piezoelectric element during the transient period when the fuel injection time is changed abruptly may be improved and the electric energy applied to the piezoelectric element during such period is optimized for assuring accurate fuel control.

SUMMARY OF THE DISCLOSURE

For accomplishing the above object, the present invention provides a fuel injection control device for an internal combustion engine in which an output voltage of a dc-dc converter for raising a source voltage is supplied to a piezoelectric element via a choke coil and a thyristor for controlling timing of charging said piezoelectric element, and fuel injection is controlled by expansion/contraction of said piezoelectric element comprising:

a measurement unit for measuring an amount of an electric charge supplied to said piezoelectric element; and a control unit for controlling an increase/decrease of the output voltage of said dc-dc converter based on a comparison result of a measured amount of the electric charge and a command value.

In the present invention, the command value is preferably set to a value less than a maximum value of an electric charge supplied to the piezoelectric element.

The present invention also provides a fuel injection control device for an internal combustion engine in which an output voltage of a dc-dc converter for raising a source voltage is supplied to a piezoelectric element via a choke coil and a thyristor for controlling timing of charging said piezoelectric element, and fuel injection is controlled by expansion/contraction of said piezoelectric element comprising:

a current voltage converting unit having a current detection device arranged between said dc-dc converter and said choke coil, with the current as detected by said current detection device being integrated and converted into a voltage;

a command value calculating unit for calculating a command value of electric charge using an output voltage of said dc-dc converter;

a command value reducing unit for reducing a value as found by said command value calculating unit, a first comparator for comparing output voltages of said current-voltage converting unit and said command value reducing unit;

a second comparator for comparing output voltages of said current-voltage converting unit and said command value calculating unit;

a suppression controlling unit for detecting a peak value of a charging current using an output signal of said second comparator for outputting a detected peak current signal;

a latch unit to a data terminal and a clock input of which an output signal of said first comparator and said peak current signal are supplied, respectively, a capacitor charged or discharged depending on an output of said latch unit;

a timer unit for controlling charging/discharging time of said capacitor; and a third comparator for comparing a terminal voltage across said capacitor and an output voltage of said dc-dc converter, the output voltage level of said dc-dc converter being controlled in response to an output signal of said third comparator.

The present invention further provides a fuel injection control device for an internal combustion engine further comprising a switching unit for shorting the choke coil, with the switching unit being controlled by an output control signal of the suppression controlling unit.

SUMMARY OF THE PREFERRED EMBODIMENT

The piezoelectric element is changed in capacitance with a change in temperature. An electric energy supplied to the piezoelectric element is expressed as $CV^2/2$, where C and V being the capacitance and the applied voltage, respectively, such that, if the applied voltage remains constant despite changes in capacitance, an excess energy is supplied to the piezoelectric element. For this reason, the conventional practice has been to control the applied voltage to maintain the energy constant.

The electric energy may also be expressed as $QV/2$, where Q denotes an electric charge. The present invention envisages to maintain the electric energy supplied to the piezoelectric element constant by controlling the electric charge Q.

During the transient state when the fuel injection control signal is changed from the narrow pulse width state to the broad pulse width state, the voltage applied to t]he piezoelectric element becomes smaller such that the predetermined amount of extension of the piezoelectric element can not be realized, with the electric energy supplied to the piezoelectric element being in shortage.

Consequently, the amount of the electric charge to be supplied has to be increased. However, if the maximum amount of the electric charge that can be supplied is equal to the target value of an electric charge adopted in the feedback control, it becomes impossible to supply an electric charge further.

In the present invention, the targeted maximum value of the electric charge in the feedback control is set to a value smaller than the maximum value that can be supplied so as to be able to increase or decrease the electric charge. A feedback control loop is provided the fuel injection device of the present invention to increase or decrease the output voltage of the dc-dc converter in a controlled manner to increase or decrease the amount of the electric charge supplied to the piezoelectric element for controlling the amount of extension or contraction of the piezoelectric element.

According to the present invention, an excess electric energy supplied to the piezoelectric element is suppressed in the following manner.

The current flowing through a charge measurement resistor is integrated to measure the electric charge and the measured value of the electric charge is compared to a target or command value as found by command value calculating means. If the measured value is larger than the command value, a choke coil is shorted by switching means for inhibiting the supply of the excess electric energy to the piezoelectric element.

According to the present invention, as described above, the electric energy consumption may be controlled to be constant by controlling the current supplied to the piezoelectric element. Thus there is no risk that the electric energy supplied to the piezoelectric element be in shortage during the transient state to render it impossible to obtain the pre-determined extension of the piezoelectric element, while there is also no risk that an excess amount of the electric energy might be supplied to the element, so that the fuel injection may be supplied accurately with the result that the fuel injection control may be performed with improved response with high economic merits.

DETAILED DESCRIPTION OF THE PREFERRED EMBODIMENTS

Figure 1:
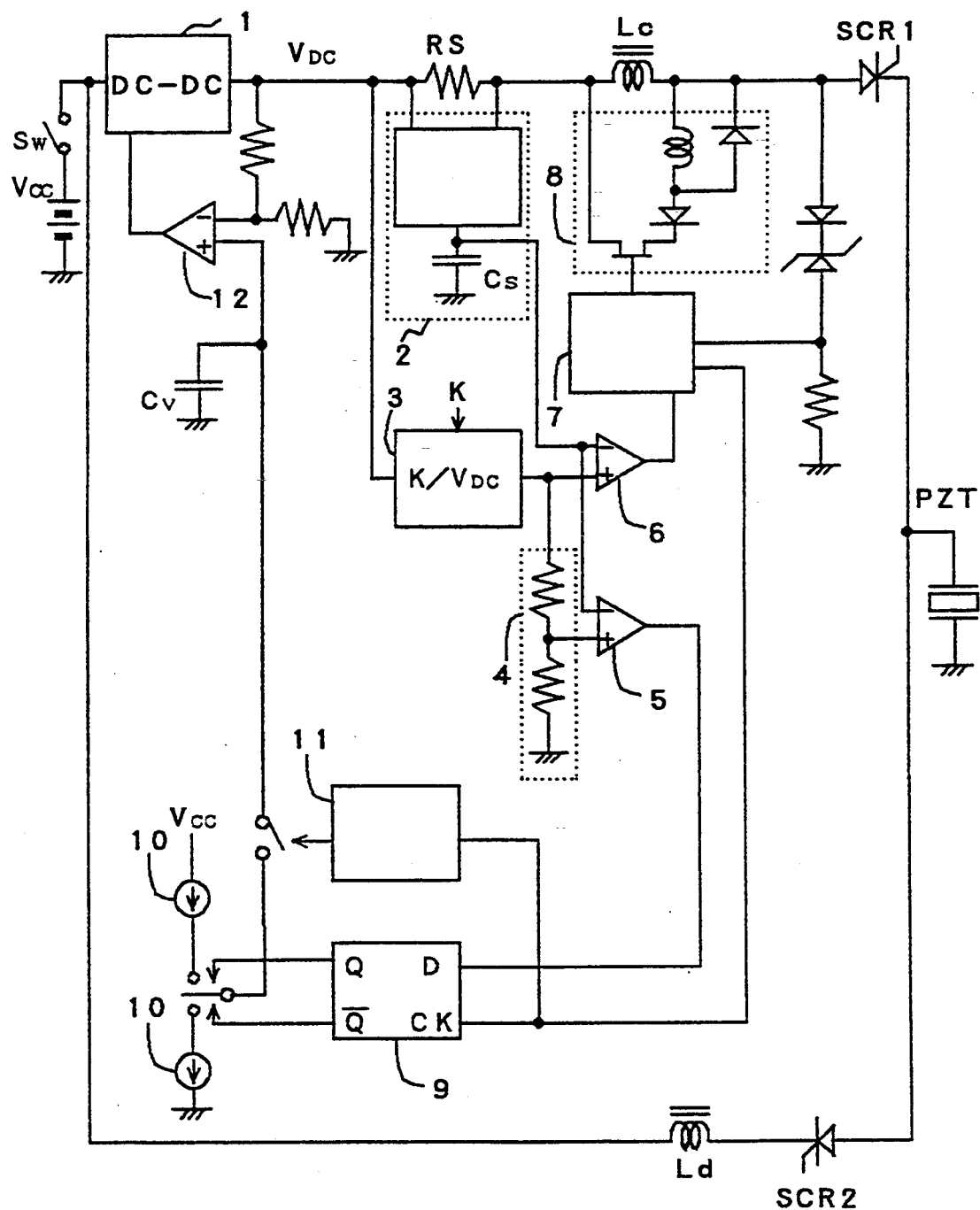
FIG. 1 shows a driving control circuit diagram for the piezoelectric element according to an embodiment of the present invention.

Referring to the drawings, a preferred embodiment of the present invention is explained.

FIG. 1 shows an embodiment of the present invention, in which a piezoelectric element driving circuit for controlling the charging energies is shown. The circuit shown therein has the function of adjusting the voltage across the dc-dc converter and the function of suppressing the charging.

The function for adjusting the dc-dc converter output voltage serves to control the expansion and contraction of the piezoelectric element PZT. This function is realized by function blocks comprising a dc-dc converter 1, a current-voltage converting unit 2, a command value calculating unit 3, a command value reducing unit 4, a first comparator 5, a second comparator 6, a suppression control unit 7, a latch unit 9, a constant current source 10, a timer 11 and a third comparator 12.

The control of the output voltage of the dc-dc converter 1 is performed in the following manner. The amount of an electric charge supplied to the piezoelectric element PZT is set to 100%, where there is no feedback loop, and the amount of an electric charge is not controlled. The target amount $Q'_{REF}$ of the electric charge adopted in a feedback control is set e.g. at a 90%-point, so that the output voltage of the dc-dc converter 1 may be controlled in order to avoid a situation in which the amount of the electric charge is saturated to render the control unfeasible, as shown in FIG. 2.

Figure 2A:
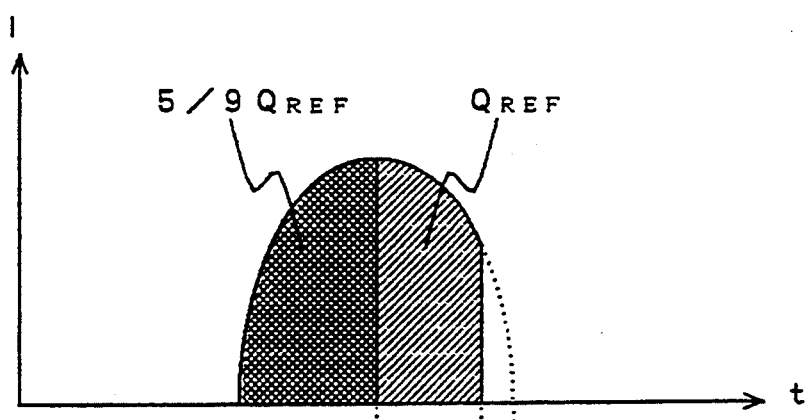
FIG. 2A shows a waveform diagram showing the charging current waveform to the piezoelectric element.
Figure 2B:
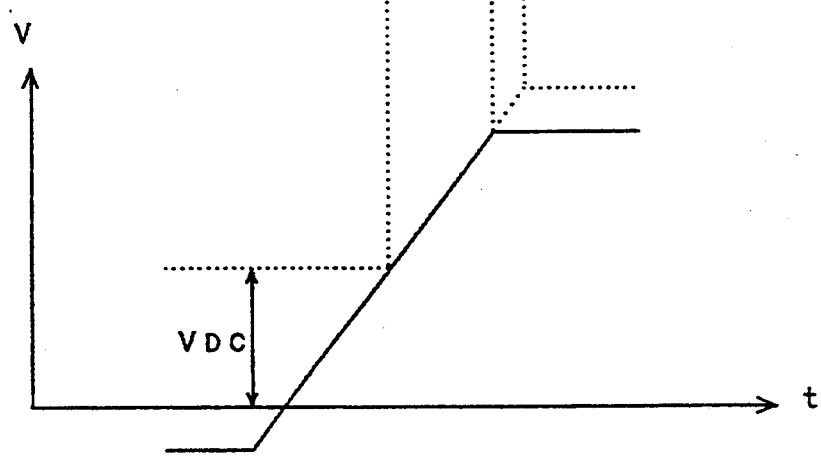
FIG. 2B shows a waveform diagram showing the terminal voltage waveform across the piezoelectric element.

Referring to FIG. 2, the charging current waveform to the piezoelectric element is shown at (A) and the terminal voltage waveform of the piezoelectric element is shown at (B).

As the charging current is supplied to the piezoelectric element PZT, the amount of the electric charge stored in the piezoelectric element PZT is increased. When the charging current reaches its peak, the amount of electric charge stored in the element PZT is equal to 50% of the maximum amount of the electric charge which may be attained in the absence of the feedback control.

Since the command value of the electric charge is set to 90% in the present embodiment, the amount of the electric charge at a time point corresponding to 50%-charging becomes equal to 5/9 of the command value of the electric charge $Q_{REF}$. Consequently, when the feedback control is performed, the output voltage of the dc-dc converter 1 is controlled on the basis of the comparison of whether the measured quantity of the electric charge is larger or smaller than 5/9 of the command value $Q_{REF}$.

Referring to FIG. 1, in the operation of the dc-dc converter voltage adjustment function, the dc power source $V_{cc}$ is applied via an ignition switch Sw to the dc-dc converter 1. The voltage raised by the dc-dc converter 1 to e.g. 200 V to 500 V is applied via a charge measurement resistor Rs, a choke coil Lc and a thyristor SCR1 to the piezoelectric element PZT. A trigger signal for controlling fuel injection is supplied from an external circuitry not shown to a gate terminal of the thyristor SCR1, which is turned on when the trigger signal is activated.

The electric charge supplied to the piezoelectric element PZT are sequentially monitored by the charge measurement resistor Rs and integrated by a capacitor Cs provided within the current-voltage converting unit 2 so as to be converted into a voltage value which is entered to a first comparator 5 as a measured value of the electric charge.

On the other hand, an output voltage VDC of the dc-dc converter 1 is fed to a command value calculating unit 3. Within the command value calculating unit 3, the command value of electric charge $Q_{REF}$ is calculated by an equation $Q_{REF}=K/VDC$, where K is a predetermined value of an electric energy.

The command value $Q_{REF}$ is reduced to 5/9 by the command value reducing unit 4. As shown in FIG. 1, the command value reducing unit 4 is made up of voltage divider resistors. The value corresponding to 5/9 of the desired amount of the electric charge $Q_{REF}$ is fed to the first comparator 5.

The value of the measured amount of the electric charge is compared by the first comparator 5 with the value corresponding to 5/9 of the command value of the electric charge $Q_{REF}$. If the measured amount of the electric charge is smaller or larger than 5/9 $Q_{REF}$, an output of the first comparator 5 is turned to a high level or to a low level, respectively.

The measured amount of the electric charge is also compared with the command value of the electric charge $Q_{REF}$ by the second comparator 6, a comparison output of which is fed to the suppression control unit 7. The suppression control unit 7 detects the peak value of the charging current to generate a peak current timing signal, while controlling a switching unit 8.

An output signal of the first comparator 5 is entered to a data input terminal of the latch unit 9, to the clock input terminal of which the peak current timing signal generated by the suppression control unit 7 is entered as a clock signal.

If the measured amount of the electric charge is smaller than 5/9 $Q_{REF}$, a high-level signal is fed from the first comparator 5 to the data input terminal of the latch unit 9. An output signal at an output terminal Q of the latch unit 9 is at a high level, so that the current is caused to flow from the constant current source 10 to a capacitor Cv. The result is that an output of the third comparator 12 is turned to a high level, and the output of the dc-dc converter 1 rises to a higher voltage. Then, the charging current is increased and the electric charge flowing through the charge measurement resistor Rs is increased for supplying a pre-determined quantity of electric energy to the piezoelectric element PZT.

The timer unit 11 is actuated by the peak current timing signal and adapted to permit the current of the constant current source 10 to be supplied to or discharged from the capacitor Cv only during the time interval as set by the timer unit 11. This time interval is constant during the normal operation.

However, the time interval may be set during e.g. a power on time to a value 10 times as long as that for the normal operation so that the initially set time interval lasts until such time as the output voltage of the dc-dc converter 1 is controlled to be decreased for the first time. In this manner, the rise time of the feedback loop may be reduced.

The charging suppressing function serves to suppress an excess energy consumption by the piezoelectric element. With the charging suppressing function, it is possible to inhibit a larger energy consumption which cannot be inhibited with the dc-dc converter voltage controlling function alone. The charging suppressing function is realized by function blocks comprising a current-voltage converting unit 2, a command value calculating unit 3, a second comparator 6, a suppression control unit 7 and a switching unit 8.

In the operation of the charging suppressing function, the measured amount of the electric charge, as found by the current-voltage converting unit 2, is compared by the second comparator 6 with a desired amount of the electric charge as found by the command value calculating unit 3.

If the measured amount of the charges is larger than the command value, the switching unit 8 is turned on by the output control signal of the suppression control unit 7 for shorting the choke coil Lc. The result is that the current flowing through the thyristor SCR1 is lowered to a value lower than its holding current so that the thyristor SCR1 is turned off to inhibit the supply of an excess energy to the piezoelectric element PZT.

It should be noted that still further objects of the present invention will become apparent in the entire disclosure and that modifications apparent in the art can be done without departing the gist and scope of the present invention as disclosed herein and claimed as appended.

What is claimed is:

1. A fuel injection control device for an internal combustion engine in which an output voltage of a dc-dc converter for raising a source voltage is supplied to a piezoelectric element via a choke coil and a thyristor for controlling timing of charging said piezoelectric element, and fuel injection is controlled by expansion/contraction of said piezoelectric element comprising:

a measurement unit for measuring an amount of an electric charge supplied to said piezoelectric element; and a control unit for controlling an increase/decrease of the output voltage of said dc-dc converter based on a comparison result of a measured amount of the electric charge and a command value.

2. A fuel injection control device for an internal combustion engine in which an output voltage of a dc-dc converter for raising a source voltage is supplied to a piezoelectric element via a choke coil and a thyristor for controlling timing of charging said piezoelectric element, and fuel injection is controlled by expansion/contraction of said piezoelectric element comprising:

a current voltage converting unit having a current detection device arranged between said dc-dc converter and said choke coil, with the current as detected by said current detection device being integrated and converted into a voltage;

a command value calculating unit for calculating a command value of electric charge using an output voltage of said dc-dc converter;

a command value reducing unit for reducing a value as found by said command value calculating unit;

a first comparator for comparing output voltages of said current-voltage converting unit and said command value reducing unit;

a second comparator for comparing output voltages of said current-voltage converting unit and said command value calculating unit;

a suppression controlling unit for detecting a peak value of a charging current using an output signal of said second comparator for outputting a detected peak current signal;

a latch unit to a data terminal and a clock input of which an output signal of said first comparator and said peak current signal are supplied, respectively, a capacitor charged or discharged depending on an output of said latch unit;

a timer unit for controlling charging/discharging time of said capacitor; and a third comparator for comparing a terminal voltage across said capacitor and an output voltage of said dc-dc converter, the output voltage level of said dc-dc converter being controlled in response to an output signal of said third comparator.

3. A fuel injection control device as defined in claim 2 further comprising switching means for shorting said choke coil, said switching means being controlled by an output control signal of said suppression controlling unit.

4. A fuel injection control device as defined in claim 1 or 2 wherein said command value is set to a value less than a maximum value of an electric charge supplied to said piezoelectric element.

* * * * *